Jan. 4, 1955   J. P. HAWORTH   2,698,503
FISHHOOK SHARPENER
Filed Dec. 28, 1953
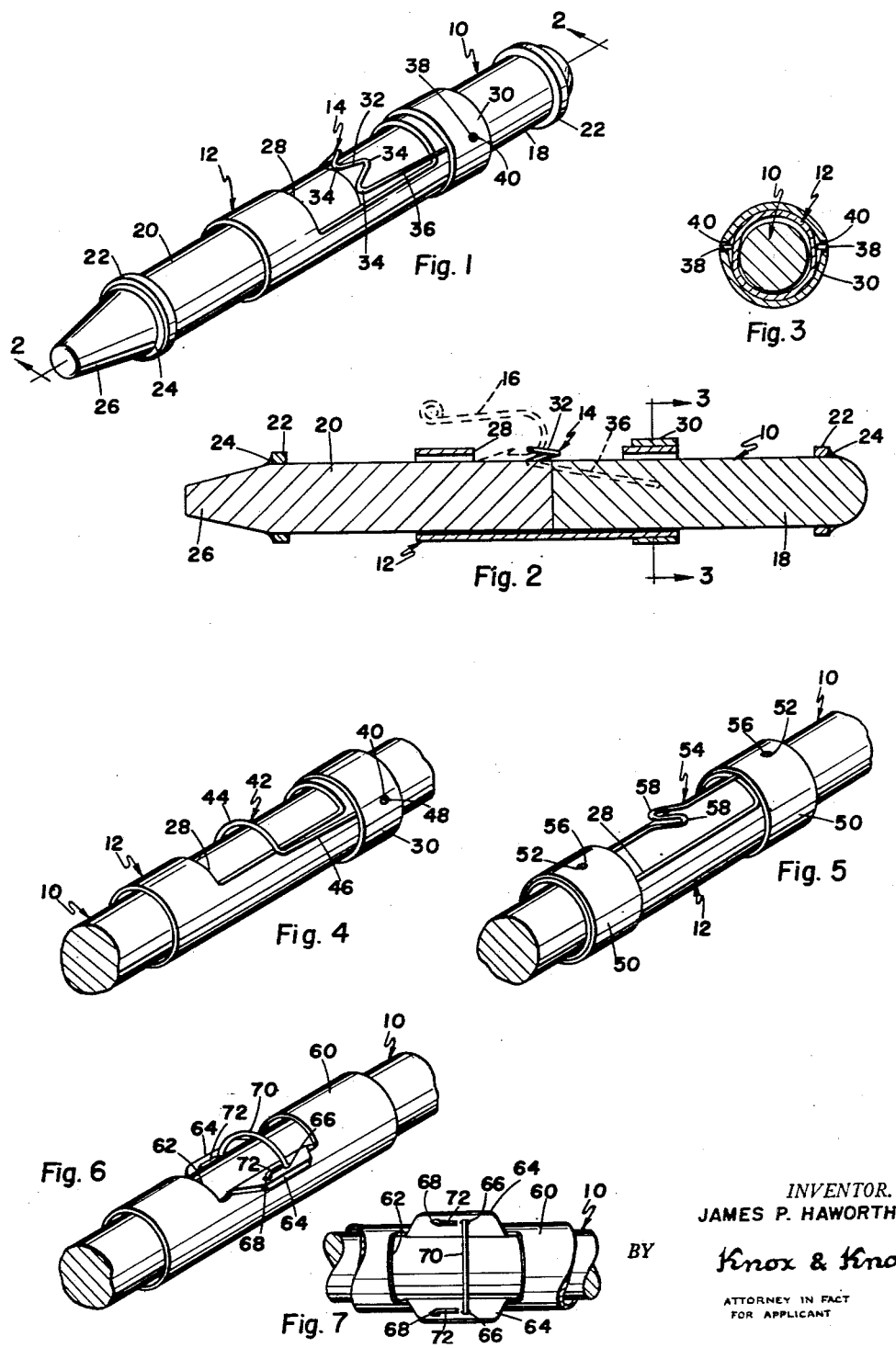
INVENTOR.
JAMES P. HAWORTH
BY Knox & Knox
ATTORNEY IN FACT
FOR APPLICANT

United States Patent Office 2,698,503
Patented Jan. 4, 1955

2,698,503

FISHHOOK SHARPENER

James P. Haworth, San Diego, Calif.

Application December 28, 1953, Serial No. 400,404

14 Claims. (Cl. 51—34)

The present invention relates generally to abrasive sharpening devices and more particularly to a fish hook sharpener.

The primary object of this invention is to provide a fish hook sharpener comprising an abrasive stick and a slidable, rotatable sleeve having improved, simple means for holding fish hooks in correct sharpening position against the abrasive surface.

Another object of this invention is to provide a fish hook sharpener having both fine and coarse grades of abrasive and which is ideally adapted for use with both large and small hooks.

Another object of this invention is to provide a fish hook sharpener having a tapered end to facilitate sharpening of all portions of fish hooks and particularly the inside of the barb portions.

Another object of this invention is to provide a fish hook sharpener which may be used to sharpen all sizes and types of fish hooks.

Finally, it is an object to provide a fish hook sharpener of the aforementioned character which is simple, safe and convenient to operate, and which will give generally efficient and durable service, provision being made for visual checking of the positioning of the hook during the grinding operation to facilitate precision grinding.

With these and other objects definitely in view, this invention consists in the novel construction, combination and arrangement of elements and portions, as will be hereinafter fully described in the specification, particularly pointed out in the claims and illustrated in the drawing which forms a material part of this disclosure and wherein similar characters of reference indicate similar or identical elements and portions throughout the specification and throughout the views of the drawing, and in which:

Fig. 1 is a perspective view of the fish hook sharpener.

Fig. 2 is a longitudinal sectional view taken on the line 2—2 of Fig. 1.

Fig. 3 is a sectional view taken on the line 3—3 of Fig. 2.

Fig. 4 is a fragmentary perspective view of a slightly modified form of the fish hook guide sleeve.

Fig. 5 is a fragmentary perspective view of a further modified form of the fish hook guide sleeve.

Figs. 6 and 7 are fragmentary perspective views of yet another modified form of the guide sleeve.

Referring now to the drawing and in particular to Figs. 1–3, the fish hook sharpener comprises an abrasive stick 10 on which is fitted a freely slidable and rotatable sleeve 12. Attached to the sleeve 12 is a resilient wire saddle 14 which holds a fish hook 16, as shown in dash line in Fig. 2, in the correct sharpening position.

The abrasive stick 10 comprises a fine abrasive portion 18 and a coarse abrasive portion 20, the portions being joined by cementing or other suitable means to constitute a unitary rod-like member. Adjacent each end of the abrasive stick 10 is a retaining ring 22 secured in place by adhesive, so that the sleeve 12 is retained on the abrasive stick. The end of the coarse abrasive portion 20 is tapered to a conoidal form as indicated at 26.

The sleeve 12 is of tubular metallic construction and has an elongated opening 28 to expose the abrasive stick 10. Fitted on one end of the sleeve 12 is a collar 30 which secures the saddle 14 firmly in place. The saddle 14 comprises a multiple return folded portion 32 constituting a plurality of opposed loops 34, the ends of said folded portion being extended to form arms 36 which are inserted between the sleeve 12 and the collar 30. The tips 38 of the arms 36 are turned outwardly and are engaged in apertures 40 in the collar 30. The collar 30 is held in place by cement or the like to prevent slippage. It is noteworthy that the collar 30 firmly engages the end portions of the saddle adjacent the tips 38 so that the saddle is firmly held in proper relationship with the abrasive stick 10. The natural resiliency of the wire arms 36 facilitates securement of the desired pressure of the hook against the stick 10 during the actual sharpening operation, to achieve precision sharpening.

To sharpen a fish hook the hook portion is engaged in one of the loops 34, and the abrasive stick 10 is reciprocated or rotated within the sleeve 12 and against the point of the hook. The opposed loops 34 facilitate the insertion of the fish hook from either end to use either the fine or coarse abrasive. The resiliency of the saddle 14 also facilitates insertion of the hook in place against the abrasive in the correct position and, of course, this same resiliency facilitates removal of the hook. The inside of the barb portion of the hook may be sharpened by inserting the tapered end 26 therein and rotating the abrasive stick with the barb held thereagainst.

The saddle 14 may be replaced, if damaged, by first removing one of the retaining rings 22 to allow the sleeve 12 to be removed from the abrasive stick. The cement 24 can ordinarily be softened by application of heat such as a match flame, this being a particularly useful feature when repairs are necessary on a fishing trip and when no tools are accessible. The collar 30 is also removed by softening the cement therein by heating, so that the wire saddle 14 may be detached. When the device is reassembled, the cement is again heated and, in cooling, once more secures the portions of the device in place.

A modified form of the sleeve structure is shown in Fig. 4. The sleeve 12 and collar 30 are as previously described and are fitted on an abrasive stick 10. The saddle 42, however, comprises a simple arcuate cross bar 44 extending transversely across the opening 28, the ends of said cross bar being extended to form arms 46. The tips 48 of the arms 46 are outwardly turned and are engaged in the apertures 40. The method of operation is similar to that described above, fish hooks being inserted from either side of the cross bar 44 and held against the abrasive surface.

A further modified form of the device is shown in Fig. 5, the abrasive stick 10 and sleeve 12 being as described above. In this particular structure a collar 50 is secured to each end of the sleeve 12, each collar having therein a single aperture 52. The saddle 54 comprises a longitudinal wire element extending axially above the opening 28, the tips 56 of said saddle being upwardly turned and engaged in the apertures 52. At the center of the saddle 54 is a substantially S-shaped bend comprising a pair of opposed loops 58 in which a fish hook may be held.

Yet another modified form of the sleeve structure is shown in Figs. 6 and 7. The sleeve 60 is longitudinally divided for a portion of its length and the divided portions are turned outwardly to provide an opening 62. The outwardly turned portions of the sleeve 60 constitute a pair of opposed lugs 64 and each of said lugs has a pair of apertures 66 and 68. A simple arcuate wire saddle 70 extends across the opening 62, the ends 72 of said saddle being inserted through the apertures 66. The ends 72 are then returned through the apertures 68 and clamped tightly against the lugs 64 to hold the saddle 70 in place.

It will be seen that in all forms of the device, the fish hook is held in place with uniform pressure against the abrasive surface by the resiliency of the wire saddle, this resiliency allowing all commonly used sizes of hooks to be inserted. The fish hook is visible at all times during sharpening so that the point may be finished accurately. The tapered end of the abrasive stick 10 facilitates sharpening the inside of the barb portion of a hook and may also be used for removing burrs from the hook for making final touches to the point. The saddle portion is easily replaced if damaged or worn as is the sleeve, the abrasive stick normally being extremely long wearing. The provision of both fine and coarse abrasive enables the user to sharpen a fish hook quickly with the coarse portion and then finish the point accurately with the fine portion.

The operation of this invention will be clearly comprehended from a consideration of the foregoing description of the mechanical details thereof, taken in connection with the drawing and the above recited objects. It will be obvious that all said objects are amply achieved by this invention.

Further description would appear to be unnecessary.

It is understood that minor variation from the form of the invention disclosed herein may be made without departure from the spirit and scope of the invention, and that the specification and drawing are to be considered as merely illustrative rather than limiting.

I claim:

1. A fish hook sharpener comprising an abrasive stick, a sleeve slidable and rotatable on said abrasive stick, and a resilient saddle on said sleeve for holding a fish hook in frictional contact with said abrasive stick.

2. A fish hook sharpener comprising an abrasive stick, a sleeve slidable and rotatable on said abrasive stick, said sleeve having an opening therein, a resilient saddle secured to said sleeve and extending across said opening for holding a fish hook in frictional contact with said abrasive stick.

3. A fish hook sharpener comprising an abrasive stick, a sleeve slidable and rotatable on said abrasive stick, said sleeve having an opening therein, a resilient saddle secured to said sleeve and extending across said opening for holding a fish hook in frictional contact with said abrasive stick, and retaining rings secured to said abrasive stick adjacent each end thereof.

4. A fish hook sharpener comprising an abrasive stick, a sleeve slidable and rotatable on said abrasive stick, said sleeve having an opening therein, a resilient saddle secured to said sleeve and extending across said opening for holding a fish hook in frictional contact with said abrasive stick, and retaining rings secured to said abrasive stick adjacent each end thereof, one end of said abrasive stick being tapered.

5. A fish hook sharpener comprising an abrasive stick, a sleeve slidable and rotatable on said abrasive stick, said sleeve having an opening therein, a collar at one end of said sleeve, a resilient wire saddle secured between said collar and said sleeve and extending across said opening for holding a fish hook in frictional contact with said abrasive stick.

6. A fish hook sharpener comprising an abrasive stick having fine and coarse abrasive portions, a sleeve slidable and rotatable on said abrasive stick, said sleeve having an opening therein, a resilient saddle secured to said sleeve and extending across said opening for holding a fish hook in frictional contact with said abrasive stick.

7. A fish hook sharpener comprising an abrasive stick having fine and coarse abrasive portions, a sleeve slidable and rotatable on said abrasive stick, said sleeve having an opening therein, a resilient saddle secured to said sleeve and extending across said opening for holding a fish hook in frictional contact with said abrasive stick, and retaining rings secured to said abrasive stick adjacent each end thereof and comprising stops to prevent inadvertent separation of said sleeve and stick.

8. A fish hook sharpener comprising an abrasive stick having fine and coarse abrasive portions, a sleeve slidable and rotatable on said abrasive stick, said sleeve having an opening therein, a resilient saddle secured to said sleeve and extending across said opening for holding a fish hook in frictional contact with said abrasive stick, and retaining rings secured to said abrasive stick adjacent each end thereof and comprising stops to prevent inadvertent separation of said sleeve and stick, one end of said abrasive stick being tapered.

9. A fish hook sharpener according to claim 2 wherein said saddle includes a multiple return folded portion comprising a plurality of opposed loops, each of said loops being positioned to hold a fish hook in frictional contact with said abrasive stick.

10. A fish hook sharpener according to claim 2 wherein said saddle includes an arcuate cross bar extending transversely across said opening.

11. A fish hook sharpener comprising an abrasive stick having fine and coarse abrasive portions, a sleeve slidable and rotatable on said abrasive stick, said sleeve having an opening therein, collars secured to each end of said sleeve, a resilient saddle extending longitudinally over said opening, the ends of said saddle being secured between said collars and said sleeve, said saddle having a pair of opposed loops therein each positioned to hold a fish hook in frictional contact with said abrasive stick, and retaining rings secured to said abrasive stick adjacent each end thereof and comprising stops to prevent inadvertent separation of said sleeve and stick.

12. A fish hook sharpener comprising an abrasive stick having fine and coarse abrasive portions, a sleeve slidable and rotatable on said abrasive stick, said sleeve having an opening therein, lugs extending from said sleeve at opposite sides of said opening, a resilient saddle extending transversely across said opening for holding a fish hook in frictional contact with said abrasive stick, the ends of said saddle being secured to said lugs, and retaining rings secured to said abrasive stick adjacent each end thereof and comprising stops to prevent inadvertent separation of said sleeve and stick.

13. A fish hook sharpener comprising an abrasive stick having fine and coarse abrasive portions, retaining rings secured to said abrasive stick adjacent the ends thereof, a sleeve slidable and rotatable on said abrasive stick, and resilient means attached to said sleeve for holding a fish hook in frictional contact with said abrasive stick.

14. A fish hook sharpener according to claim 13, wherein said retaining rings are removably held on said stick by thermoplastic material, said collar being removably held on said sleeve by thermoplastic material.

No references cited.